United States Patent [19]

Spanovich

[11] Patent Number: 5,035,378
[45] Date of Patent: Jul. 30, 1991

[54] VARIABLE ALIGNMENT MECHANISM

[76] Inventor: Joseph P. Spanovich, 521 Snipes Dr., St. Charles, Mo. 63303

[21] Appl. No.: 522,219

[22] Filed: May 7, 1990

[51] Int. Cl.$^5$ .................... B64C 3/038; F16H 21/044
[52] U.S. Cl. ...................................... 244/49; 244/46; 74/105
[58] Field of Search .................. 244/46, 49, 3.27–3.29, 244/110 B, 213; 74/105; 239/265.25, 265.31

[56]  References Cited

U.S. PATENT DOCUMENTS 2,750,132  6/1956  Palmer et al. ........................ 244/213
3,550,855 12/1970  Feld et al. ....................... 239/265.29

FOREIGN PATENT DOCUMENTS 0613382  6/1946  United Kingdom .................. 244/46

Primary Examiner—Joseph F. Peters, Jr.
Assistant Examiner—L. Palomar

[57] ABSTRACT

An alignment mechanism for independently adjusting the deployable aerosurfaces of an aerospace vehicle in both the stowed and deployed positions. The alignment mechanism includes a guide means having a slot with both a constant width portion and a variable width portion. A slide, interconnected to the deployable aerosurfaces, is pivotally engaged to the guide means so that it travels along the length of the slot. The slide is capable of pivotal movement when the slide is engaged in the slot's variable width portion and incapable of pivotal movement when it is engaged in the slot's constant width portion. An actuator is employed to selectively position the slide along the slot.

6 Claims, 3 Drawing Sheets

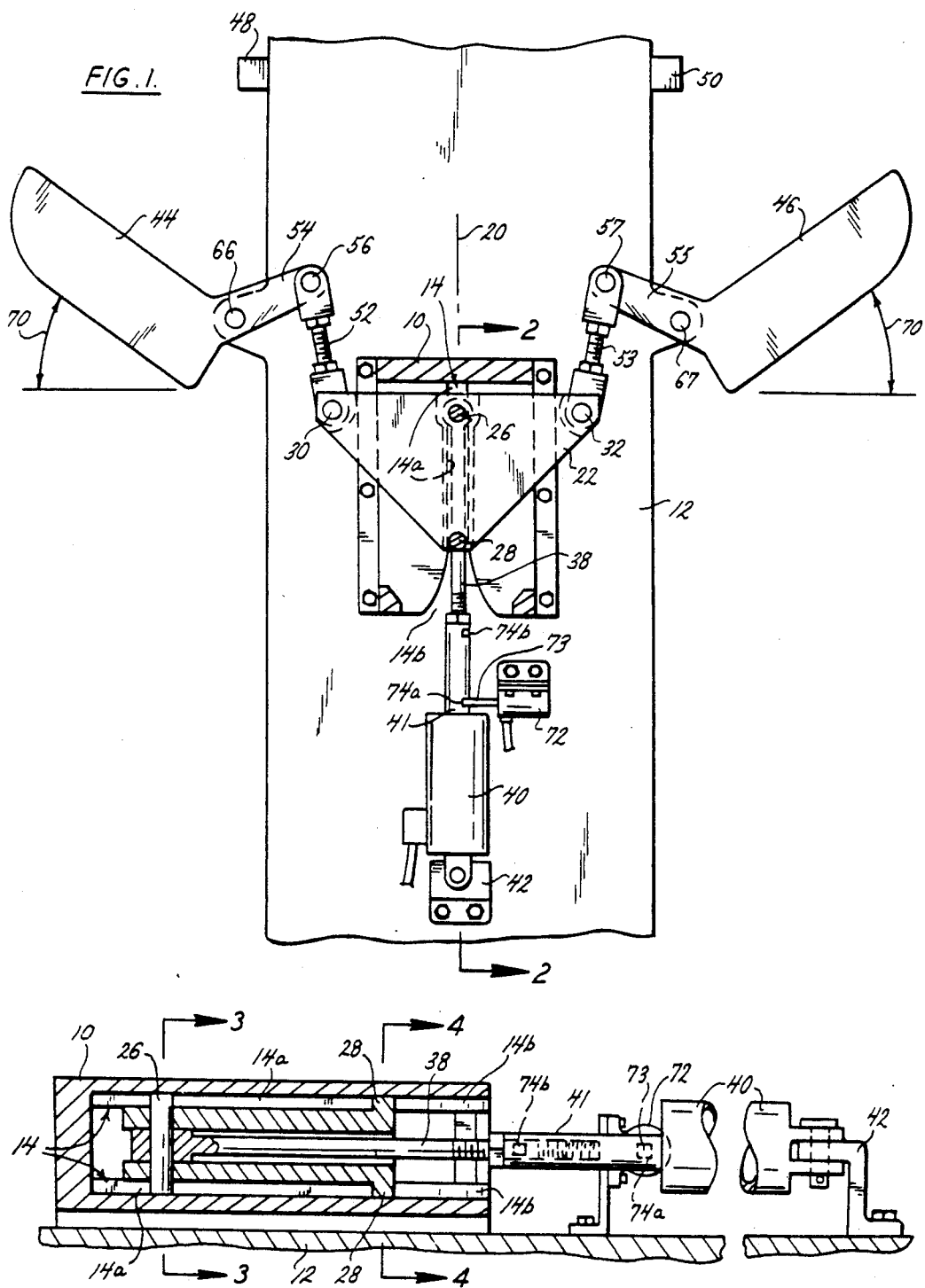

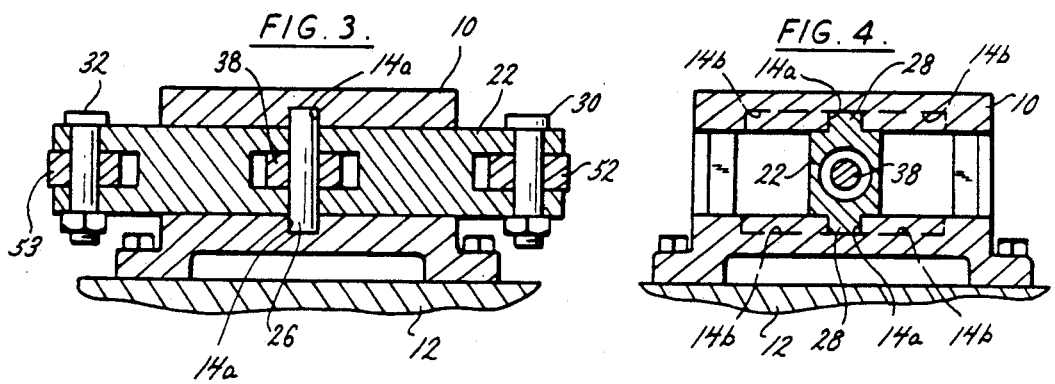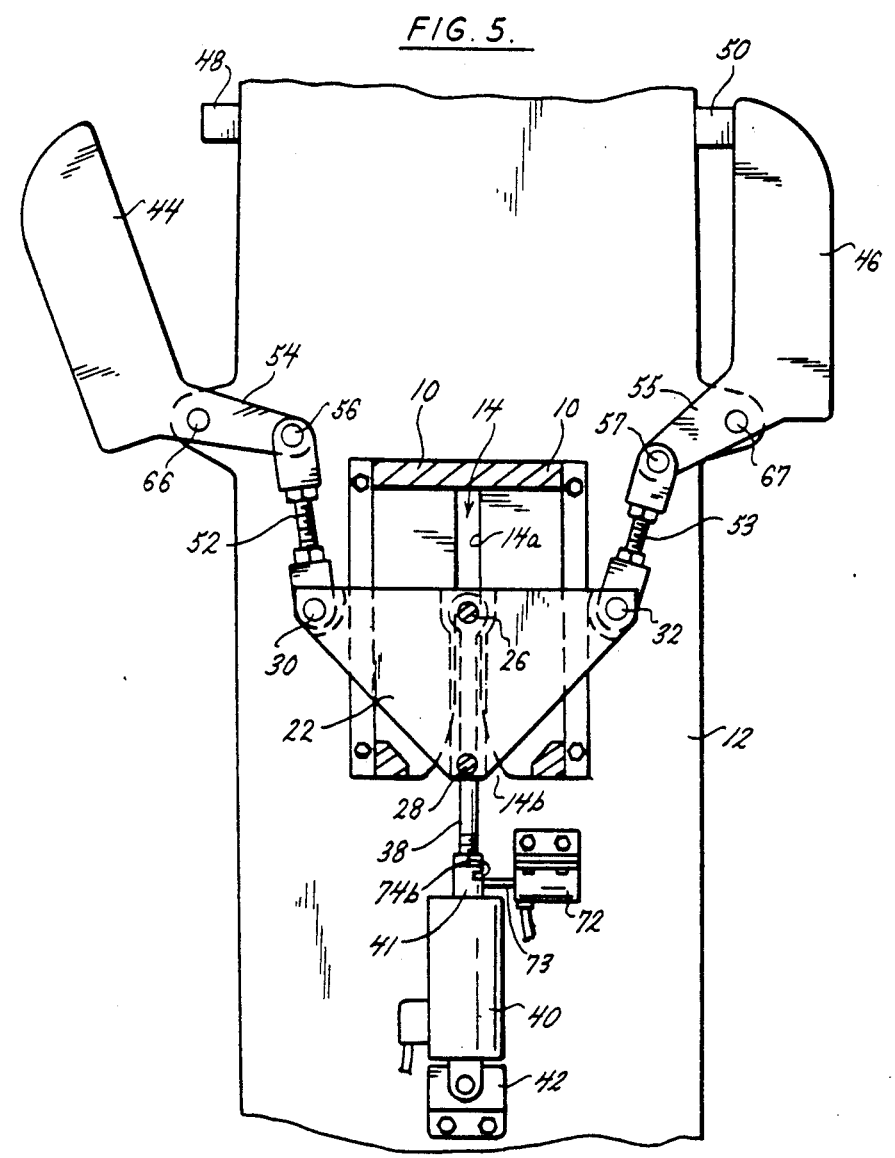

VARIABLE ALIGNMENT MECHANISM

BACKGROUND OF THE INVENTION

1. Field of the Invention

The present invention generally relates to an alignment mechanism for aerosurface deployment systems. More particularly, it is concerned with a new and improved apparatus for independently adjusting deployable aerosurfaces in both the stowed and deployed positions.

2. Description of the Prior Art

Accurately positioning deployable aerosurfaces, such as wings or fins, in both the stowed and deployed positions can be important for optimum aerospace vehicle performance. For example, the wings of certain missile systems must be accurately aligned and stowed for launching purposes from an aircraft or a launch tube, and then deployed to an open position while the missile is in free flight. During captive carriage, the wings must be precisely positioned to interface with the carrier, such as an aircraft bomb eject rack. In free flight, precise, symmetric wing sweep angle is critical for aerodynamic performance.

Because prior art aerospace vehicles typically employ a single actuator for deploying two or more aerosurfaces, the aerosurfaces generally do not operate independently of each other. For example, in a missile system having a pair of wings, the movement of one wing a certain amount results in the other wing moving a corresponding amount; if all linkages and pivot point locations are perfectly aligned each wing position will be a mirror image of the other. However, if any linkages or pivot point locations are not perfectly aligned, the wing positions will be unsymmetrical due to an accumulation of dimensional tolerances.

It is relatively easy to adjust the sweep angle of each deployable aerosurface when the actuator, common to all the aerosurfaces, is fixed in a deployed configuration. For example, the lengths of the pushrods which connect the common actuator pushrod to their corresponding deployable aerosurface horns can be adjusted so that the deployable aerosurfaces are positioned to their desired sweep angles. Accordingly, when the deployable aerosurfaces are retracted to their stowed positions and the geometry of the entire kinematic system is perfectly aligned and positioned, the deployable aerosurfaces will be positioned to their designed stowed sweep angles. Any deviation from the theoretically exact orientation of the kinematic system components, however, will introduce error into the stowed aerosurface sweep angle. Each of the manufacturing tolerances that impact the geometry of the kinematic system, such as pivot axis locations, actuator alignment, or wing horn moment arm lengths, must be relatively small such that the summation of all the deviations will not result in positioning the deployable aerosurface outside the designed geometric envelope. It should be noted that if the stowed deployable aerosurfaces are readjusted for orientation in their designed stowed positions, the deployed positions will then be different and may fall out of the designed geometric envelope. Moreover, the adjustment of the deployed position directly influences the orientation of the stowed position.

Precise stowed and deployed aerosurface positions have previously been achieved by controlling the manufacturing tolerances that impact the geometry of the kinematic system. This approach has proven to be difficult and costly due to the number of tight tolerances involved. As the manufacturing tolerances become more stringent, the associated production costs increase rapidly.

SUMMARY OF THE INVENTION

The present invention provides improved performance to aerospace vehicles through a mechanism for precisely aligning deployable aerosurfaces in both the stowed and deployed positions even when machining tolerances are relatively large. By avoiding tight tolerances in the manufacture of aerospace deployment mechanisms, production costs can be significantly reduced. Because the motions of a plurality of deployable aerosurfaces are independent of each other at pre-determined orientations, this invention allows for repositioning of the stowed aerosurfaces without affecting the deployed position.

The alignment mechanism according to the present invention includes a guide means utilized in combination with the support structure of an aerospace vehicle having two or more deployable aerosurfaces. The guide means comprises a slot having a constant width portion and a variable width portion. In the preferred embodiment, the guide means is attached to the support structure of the aerospace vehicle. However, in an alternative embodiment, the guide means can be an integral part of the support structure.

A slide moves back and forth along the length of the slot via an engaging means which is integrally attached to the slide and which travels within the slot. The slide is also pivotally connected to a rod means such that the slide is capable of pivotal movement when the slide's engaging means travels within the variable width portions of the slot; however, when the slide's engaging means is traveling within the slot's constant width portion, the slide is incapable of pivotal movement.

An actuator is operably connected to the rod means for selectively positioning the slide along the slot of the guide means. In the preferred embodiment, the actuator is pivotally attached to a mounting bracket which is rigidly attached to the support structure of the aerospace vehicle. However, in an alternative embodiment, the actuator can be rigidly mounted to the support structure itself.

An interconnecting means is employed to transfer motion between the slide and the deployable aerosurfaces. In the preferred configuration, an adjustable pushrod interconnects each deployable aerosurface to the slide in the following manner: a first end of each adjustable pushrod is pivotally connected to the deployable aerosurface while a second end of each adjustable pushrod is pivotally connected to the slide.

BRIEF DESCRIPTION OF THE DRAWINGS

FIG. 1 is a schematic diagram of the alignment mechanism of the present invention with wings in a deployed position.

FIG. 2 is a sectional view taken along line 2—2 of FIG. 1 for more fully illustrating the novel features of the present invention.

FIG. 3 is a sectional view taken along line 3—3 of FIG. 2.

FIG. 4 is a sectional view taken along line 4—4 of FIG. 2.

FIG. 5 is a schematic diagram of the alignment mechanism of the present invention with wings in a stowed, misaligned position.

DETAILED DESCRIPTION OF THE PREFERRED EMBODIMENT

Figure 6:
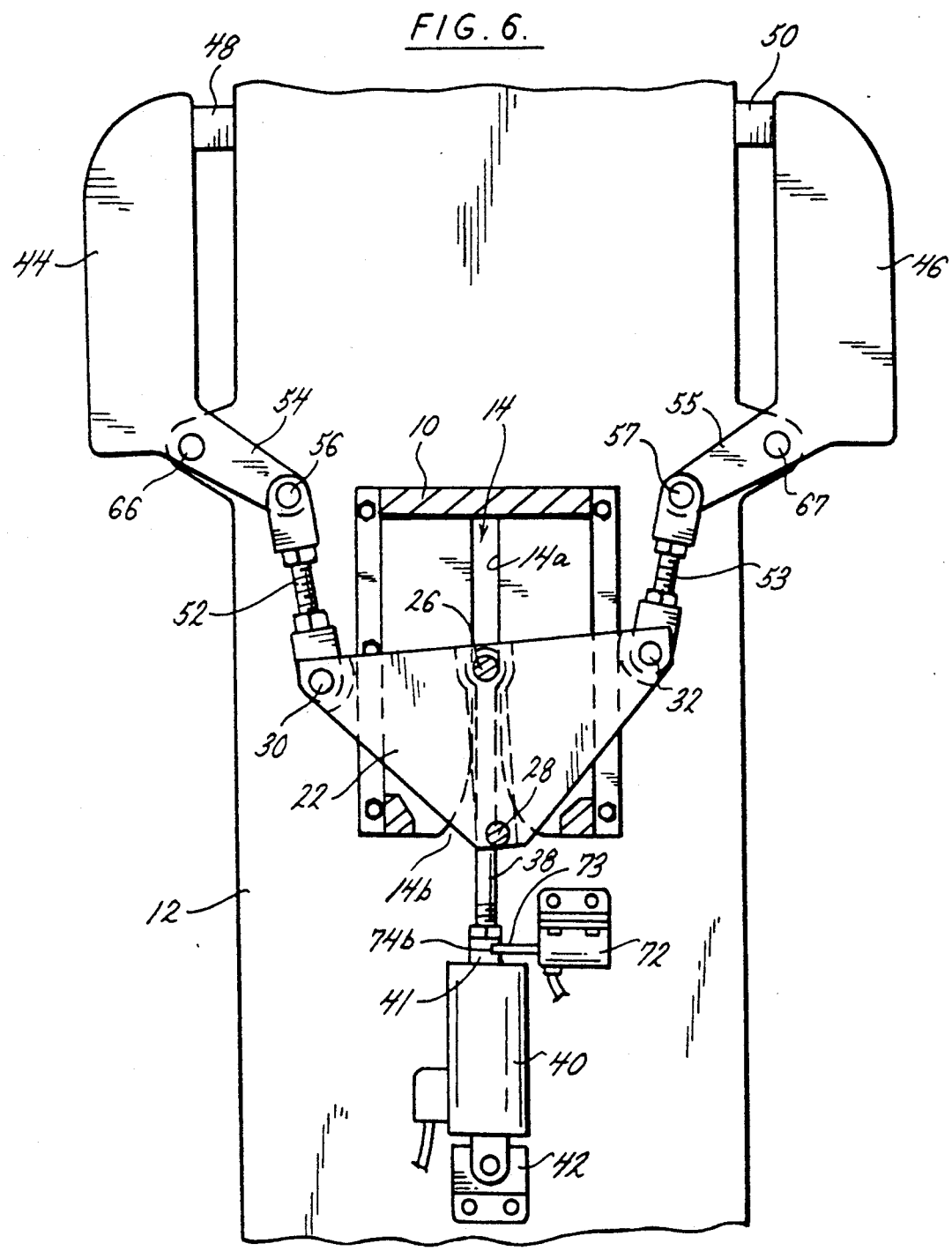
FIG. 6 is a schematic diagram of the alignment mechanism of the present invention with wings in a stowed, aligned position.

A preferred embodiment of the present invention is shown in FIGS. 1-6 on a missile system and comprises a guide 10 mounted on missile strongback 12. Guide 10 includes slot 14 which runs substantially along axis 20 and has both a constant width portion 14a and a variable width portion 14b. Slide 22 includes an engaging means 28 for pivotally engaging slide 22 within guide means 10 such that engaging means 28 is capable of translational movement along both constant width portion 14a and variable width portion 14b of slot 14. Slide 22 further includes a hole for accepting slide pin 26 which pivotally connects a first end of pushrod 38 to slide 22 such that slide pin 26 travels within constant width portion 14a of slot 14. Actuator 40, which is preferably a pyrotechnic actuator system, includes actuator pushrod 41 and is adjustably coupled to a second end of pushrod 38 for selectively positioning slide 22 along slot 14. Actuator pushrod 41 is slidably disposed within actuator 40 and includes two notches 74a and 74b. Actuator 40 is pivotally attached to mounting bracket 42 which is rigidly mounted to missile strongback 12.

Slide 22 is capable of pivotal movement about slide pin 26 when engaging means 28 travels within variable width portion 14b of slot 14; however, slide 22 is incapable of pivotal movement about slide pin 26 when engaging means 28 travels within constant width portion 14a of slot 14. Note that engaging means 28 is not connected to pushrod 38.

A first end of a first adjustable pushrod 52 is pivotally attached to slide 22 at axis 30, and a second end of adjustable pushrod 52 is pivotally attached to wing horn 54 at axis 56; a first end of a second adjustable pushrod 53 is pivotally attached to slide 22 at axis 32, and a second end of adjustable pushrod 53 is pivotally attached to wing horn 55 at axis 57. Wing horn 54 is rigidly mounted to wing 44 in close proximity to pin 66 for selectively pivoting wing 44 about pin 66, while wing horn 55 is rigidly mounted to wing 46 in close proximity to pin 67 for selectively pivoting wing 46 about pin 67.

Locking mechanism 72, rigidly attached to missile strongback 12 and adjacent to actuator pushrod 41, includes locking pin 73 which is capable of engaging notches 74a or 74b of actuator pushrod 41 to prevent longitudinal movement of actuator pushrod 41. In an alternative embodiment, locking mechanism 72 may be incorporated within actuator 40.

Operation of the preferred embodiment is carried out in the following manner: Referring to FIG. 1, with actuator pushrod 41 completely extended and all kinematic linkages locked in the deployed position by engaging locking pin 73 in notch 74a, the lengths of adjustable pushrods 52 and 53 are adjusted until a desired sweep angle 70 is obtained for wings 44 and 46. Adjustable pushrods 52 and 53 are then locked to these lengths.

As shown in FIG. 5, all kinematic linkages are unlocked by retracting locking pin 73 from actuator pushrod 41, and actuator pushrod 41 is retracted until one of the wings is positioned in the proper stowed configuration; in the preferred embodiment, this occurs when wing 46 comes into contact with wing stop 50. Note that engaging means 28 is now in diverging portion 14b of slot 14, while slide pin 26 remains in the constant width portion 14a of slot 14.

Referring now to FIG. 6, actuator pushrod 41 is further retracted until wing 44 is moved into the desired stowed position by coming into contact with wing stop 48. When actuator pushrod 41 is further retracted, engaging means 28 is in variable width portion 14b of slot 14 so that engaging means 28 can toggle to one side or the other of the variable width portion 14b. Slide 22 pivots about slide pin 26 and translates towards actuator 40, allowing misaligned wing 44 to align itself against wingstop 48 in the stowed position, while aligned wing 46 remains aligned against wingstop 50 in the desired stowed position.

With actuator pushrod 41 retracted, and wings 44 and 46 in contact with their respective wing stops 48 and 50, the length of pushrod 38 is then adjusted to allow locking pin 73 to engage in notch 74b so as to restrain translational and pivotal motion of slide 22. At this point, the length of pushrod 38 is further adjusted to pre-tension the entire kinematic system; pushrod 38 is then locked to this length.

Upon deployment of actuator 40, such as when a missile is ejected from an aircraft, locking pin 72 is retracted from actuator pushrod 41, and pushrod 38, actuator pushrod 41, slide 22, slide pin 26, and engaging means 28 are driven in the direction away from actuator 40. Simultaneously, engaging means 28 moves from variable width portion 14b into constant width portion 14a of slot 14 to realign slide 22 such that wings 44 and 46 move to preset sweep angle 70. Finally, as shown in FIG. 1, slide 22 is restrained by engaging locking pin 73 in notch 74a, thus positioning wings 44 and 46 to preset sweep angle 70.

Although the preferred embodiment is employed on a missile system, it is readily apparent that the present invention is applicable to other aerospace vehicles having a plurality of deployable aerosurfaces. Accordingly, changes and modifications in the specifically described embodiment can be carried out without departing from the scope of the this invention which is intended to be limited only by the scope of the appended claims.

What is claimed is:

1. In combination with the support structure of an aerospace vehicle having a plurality of deployable aerosurfaces, an alignment mechanism, comprising:
   (a) a guide means having a longitudinally extending slot which comprises a constant width portion and a variable width portion;
   (b) a slide means having an engaging means integrally attached thereto such that said slide means is capable of translational movement along said slot through the action of said engaging means travelling within said slot;
   (c) a rod means pivotally connected to said slide such that said slide means is capable of pivotal movement when said engaging means travels within said variable width portion of said slot, but wherein said slide means is incapable of pivotal movement when said engaging means travels within said constant width portion of said slot;
   (d) means for interconnecting said slide means and said deployable aerosurfaces; and (e) an actuator means operably connected to said rod means for selectively positioning said slide means along said slot of said guide means.

2. The alignment mechanism as recited in claim 1, further including a means for locking said deployable aerosurfaces in the stowed and deployed positions.

3. The alignment mechanism of claim 2, wherein said locking means is integral with said actuator means.

4. The alignment mechanism of claim 1, wherein said actuator is pivotally mounted to said support structure.

5. The alignment mechanism of claim 1, wherein said guide means is integral with said support structure.

6. The alignment mechanism of claim 1, wherein said interconnecting means comprises first and second adjustable rods.

* * * * *